United States Patent [19]
Endoh

[11] Patent Number: 6,157,296
[45] Date of Patent: Dec. 5, 2000

[54] LAMP BURNOUT DETECTING UNIT WITH BRANCH CONNECTION FUNCTION

[75] Inventor: Takeshi Endoh, Nagoya, Japan

[73] Assignees: Harness System Technologies Research, Ltd., Nagoya; Sumitomo Wiring Systems, Ltd., Mie; Sumitomo Electric Industries, Ltd., Osaka, all of Japan

[21] Appl. No.: 09/126,426

[22] Filed: Jul. 30, 1998

[30] Foreign Application Priority Data

Sep. 2, 1997 [JP] Japan ................................ 9-237530

[51] Int. Cl.[7] .................................................. B60Q 11/00
[52] U.S. Cl. ...................... 340/458; 340/641; 340/642; 315/83; 307/10.8
[58] Field of Search ...................... 340/458, 635, 340/641, 642, 661, 663; 315/82, 83, 131, 132, 133; 307/10.8

[56] References Cited

U.S. PATENT DOCUMENTS

| | | | |
|---|---|---|---|
| 5,075,669 | 12/1991 | Nakadozono et al. | 340/458 |
| 5,144,282 | 9/1992 | Sutterlin et al. | 340/458 |
| 5,173,685 | 12/1992 | Nimmo | 340/642 |
| 5,331,314 | 7/1994 | Koch | 340/661 |
| 5,801,623 | 9/1998 | Chen et al. | 340/458 |
| 6,005,300 | 12/1999 | Kelly | 307/10.1 |

*Primary Examiner*—Daryl Pope
*Attorney, Agent, or Firm*—Oliff & Berridge, PLC

[57] ABSTRACT

The invention is a lamp burnout detecting unit with a branch connection function which provides the advantage of having simple wiring and that the wire harness thereof can be automatically laid. The lamp burnout detecting unit includes an upper casing on which terminal press-in type connectors and a burnout detecting circuit section 16 are mounted. A printed circuit board has a branch connection function. A lower casing 19 engages the upper casing to accommodate the printed circuit board therebetween. The connectors and the burnout detecting circuit section are connected to each other through a wiring pattern of the printed circuit board. One connector is connected to a wire harness, which is connected through switches to a battery. The other connectors are connected to a wire harness extended from the lamps.

12 Claims, 5 Drawing Sheets

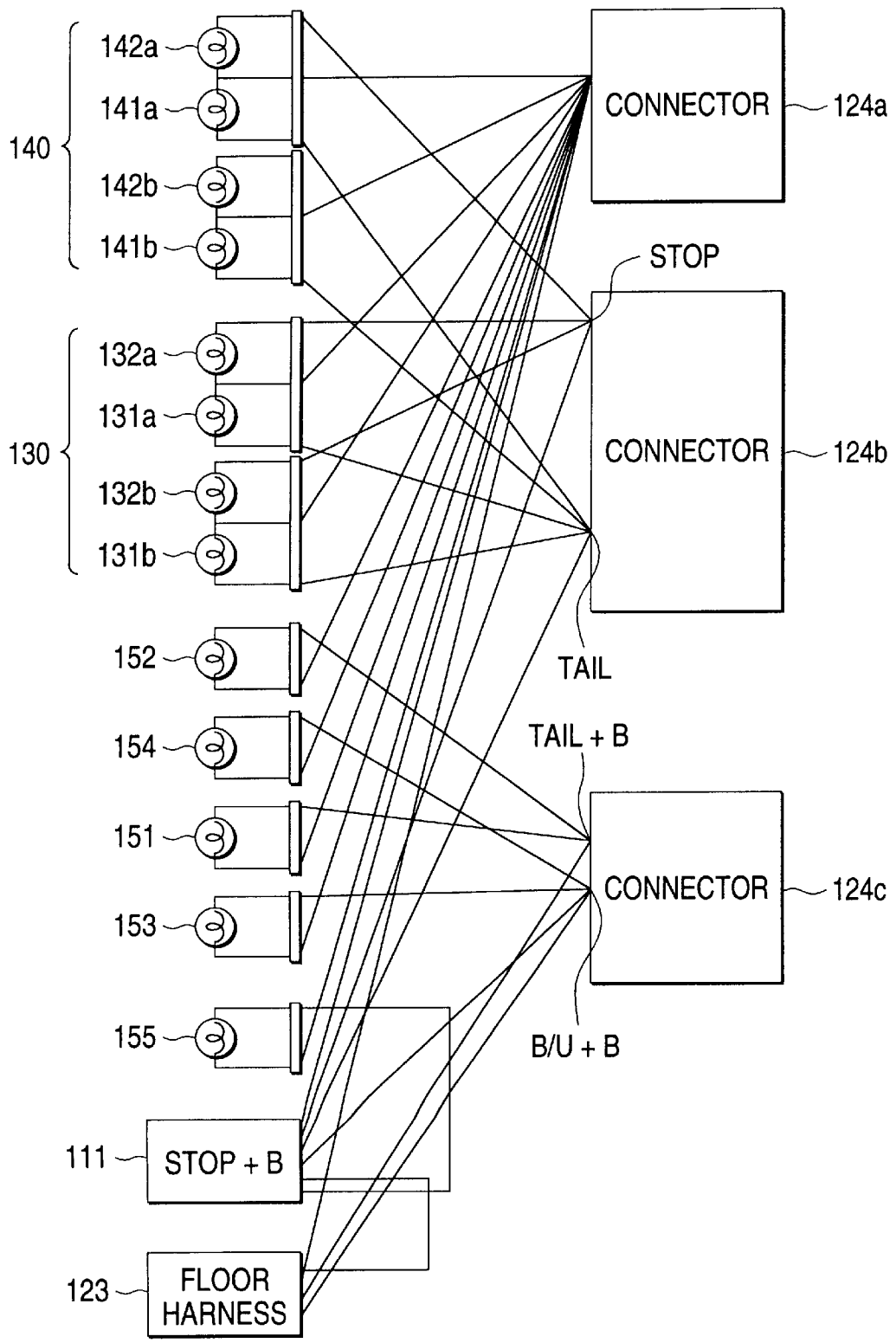

LAMP BURNOUT DETECTING UNIT WITH BRANCH CONNECTION FUNCTION

BACKGROUND OF THE INVENTION

1. Field of Invention

This invention relates to a lamp burnout detecting unit which detects the burnout of a lamp, such as a tail lamp or a stop lamp of an automobile.

2. Description of Related Art

Conventionally, the stop lamp or tail lamp of an automobile, which is connected through a switch or similar device to the battery, is provided with a device for detecting the burnout of the stop lamp or tail lamp.

FIG. 4 is a wiring diagram showing a battery and rear combination lamps with a lamp burnout detecting unit (hereinafter "a burnout detecting unit"). The power of the battery 120, which is disposed in the front of a vehicle 100, is supplied to the rear of the vehicle 100 through a tail switch 121 and a stop switch 122. The power is supplied to the rear of the vehicle 100 via a floor harness 123, which is connected to a joint connector 124 in the rear of the vehicle, so that the power of the battery 120 is supplied through the joint connector 124 to the burnout detecting unit 111 and the rear combination lamps 130 and 140.

Specifically, when the tail switch 121 and the stop switch 122 are in an "on" position (turned on), the wires of the floor harness 123, which are connected to a +B wire (connected to the positive (+) terminal) of the battery 120, are connected to the burnout detecting unit 111. The wire extending from the tail switch 121 is connected to first terminals of tail lamps 131 and 141. The wire extending from the stop switch 122 is connected to first terminals of stop lamps 132 and 142. The remaining second terminals of the lamps of the rear combination lamps 130 and 140 are connected through a rear harness to the joint connector 124, and grounded through the floor harness.

As is apparent from the above description, when the tail switch 121 or the stop switch 122 is turned on and off, the corresponding lamp is turned on and off. The burnout detecting unit 111 monitors current flowing to the lamps, so as to detect the burnout of a lamp or lamps from a decrease in the current value.

The conventional burnout detecting unit is subject to the problem that its wiring is rather intricate.

FIG. 5 is a wiring diagram showing a battery, rear combination lamps and other lamps with a conventional burnout detecting unit. In the floor harness 123, the wire (TAIL) that extends from the tail switch 121, as shown in FIG. 4, is connected to first terminals of right and left license plate lamps 151 and 152 and to a burnout detecting unit 111 through joint connector 124. The wire connected to the burnout detecting unit 111 is connected to first terminals of tail lamps 131a, 131b, 141a and 141b through joint connector 124b.

In the floor harness 123, the wire (STOP) that extends from the stop switch 122, as shown in FIG. 4, is connected through the burnout detecting unit 111 to a first terminal of a high mount stop switch 155, and through joint connector 124b to first terminals of stop lamps 132a, 132b, 142a and 142b.

Furthermore, the floor harness 123 includes +B wires connected through joint connector 124c to right and left backup (B/U lamps 153 and 154.

With respect to the +B wires, the ground (GND) wire of the floor harness 123 is connected through joint connector 124a to the grounded side (not shown) of the burnout detecting unit 111 and to the remaining second terminals of the right and left combination lamps 130 and 140, the right and left license plate lamps 151 and 152, the right and left backup lamps 153 and 154, and the high mount stop lamp 155.

As is apparent from the above description, in the wiring of the conventional burnout detecting unit 111, a plurality of +B wires and the ground wire of the floor harness are distributed to the respective lamps through a plurality of joint connectors. Therefore, the resultant wiring is unavoidably intricate; that is, it is rather difficult to provide the wiring of the lamps. Hence, it is also difficult to automatically lay wires for the lamps. The use of the joint connectors results in an increase in manufacturing costs. The joint connectors also require spaces for their installation.

SUMMARY OF THE INVENTION

In view of the foregoing, an object of the invention is to provide a lamp burnout detecting unit with a branch connection function that has simple wiring. It is also an object of the invention to provide a lamp burnout detecting unit having a wire harness that can be automatically laid. It is a further object of the invention to provide a lamp burnout detecting unit wherein it is unnecessary to provide spaces for the installation of the joint connectors.

The foregoing objects of the invention have been achieved by providing a lamp burnout detecting unit with a branch connection function that includes: a first connector to which a wire harness is connected which is connected through a switch to a power source section; a second connector to which a wire harness for a plurality of lamps is connected; a burning detecting section adapted to detect the burnout of the lamps; and a printed circuit board having a branch connection section which connects the power source wire that extends from the first connector to each of the plurality of lamps which are connected to the second connector.

In the lamp burnout detecting unit, with the printed circuit board having the branch connection section, the power wire that extends from the first connector is connected to the plurality of lamps which are connected to the second connector. Hence, the wiring of the whole system is simplified, and the installation thereof can be achieved with ease. Furthermore, the wire harness can be automatically installed easily, and it is unnecessary to provide spaces for the installation of the joint connectors.

The lamps may be rear combination lamps. In this case, the wiring of the battery and the rear combination lamps, with the lamp burnout detecting unit between them, is simplified.

Furthermore, the lamps may be tail lamps. In this case, the wiring of the battery and the tail lamps, with the lamp burnout detecting unit between them, is simplified.

Moreover, the lamps may be stop lamps. In this case, the wiring of the battery and the stop lamps, with the lamp burnout detecting unit between them, is simplified.

BRIEF DESCRIPTION OF THE DRAWINGS

FIG. 5 is a wiring diagram showing the battery, the rear combination lamps, and other lamps, with the conventional lamp burnout detecting unit interposed therebetween.

DETAILED DESCRIPTION OF PREFERRED EMBODIMENTS

A lamp burnout detecting unit with a branch connection function in accordance with a preferred embodiment of the invention is described with reference to the accompanying drawings.

Figure 1:
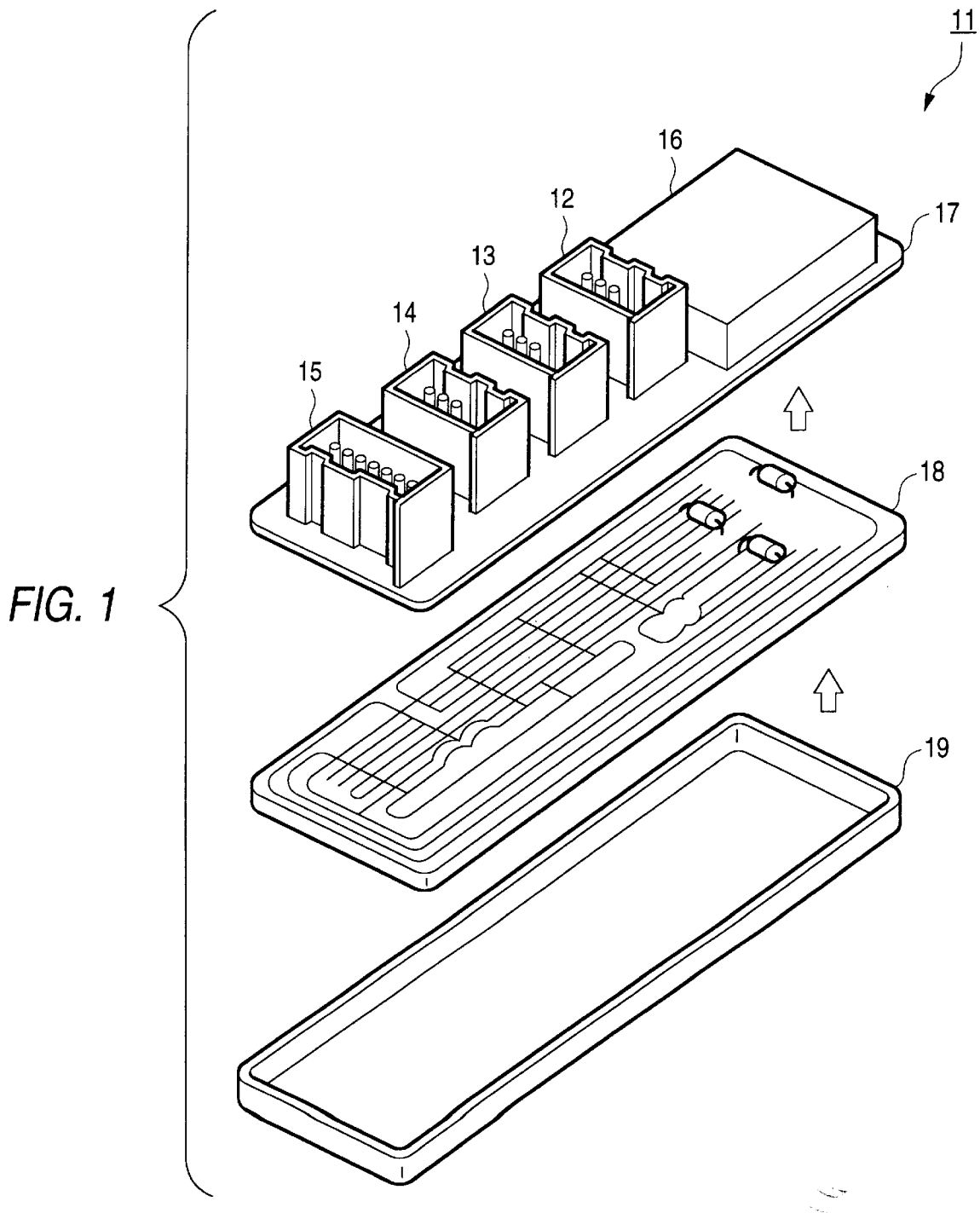
FIG. 1 is a perspective view of a lamp burnout detecting unit with a branch connection function in accordance with a preferred embodiment of the invention.

FIG. 1 is a perspective view showing the burnout detecting unit in accordance with the invention.

As shown in FIG. 1, the burnout detecting unit 11 includes an upper casing 17 on which terminal press-in type connectors 12, 13, 14 and 15 and a burnout detecting circuit section 16 are mounted; a printed circuit board 18 having a branch connection function; and a lower casing 19 which engages the upper casing 17 to accommodate the printed circuit board 18.

The printed circuit board 18 is mounted on the lower surface of the upper casing 17, so that the connectors 12, 13, 14 and 15 and the burnout detecting circuit section 16 are connected to each other through a printed circuit formed on the printed circuit board 18. However, the invention is not limited to this structure. Specifically, the above-described structure may be modified so that the upper casing 17 is used as the printed circuit board, and the printed circuit is formed on the lower surface of the printed circuit board.

The burnout detecting circuit section 16 detects the burnout of a lamp as discussed below. Specifically, a voltage across a current detecting resistor (not shown), connected in series to a lamp subject to burnout detection, is compared with a predetermined reference voltage. In this embodiment of the invention, the current detecting resistor is connected in series to a plurality of lamps (31a, 31b, 41a and 41b, or 32a, 32b, 42a and 42b described below) which are connected in parallel to one another.

The reference voltage is set to be in the range between a voltage across the current detecting resistor when all of the plurality of lamps are turned on and a voltage across the current detecting resistor when any one of them is burned out. Specifically, the burnout of a lamp is detected when the voltage across the current detecting resistor is lower than the reference voltage. This is based on the fact that, when at least one of the plurality of lamps is burned out, the current flowing in the current detecting resistor is decreased, and accordingly the voltage across the current detecting resistor is decreased, thus becoming lower than the reference voltage.

When the burnout of a lamp is detected, it is indicated, for instance, with an indicator or similar device. In this case, the burnout detecting circuit section 16 outputs a burnout detection signal. The burnout detection signal may be applied through a floor harness 23 (described below) to an external device (not shown) that controls an indicator.

Figure 2:
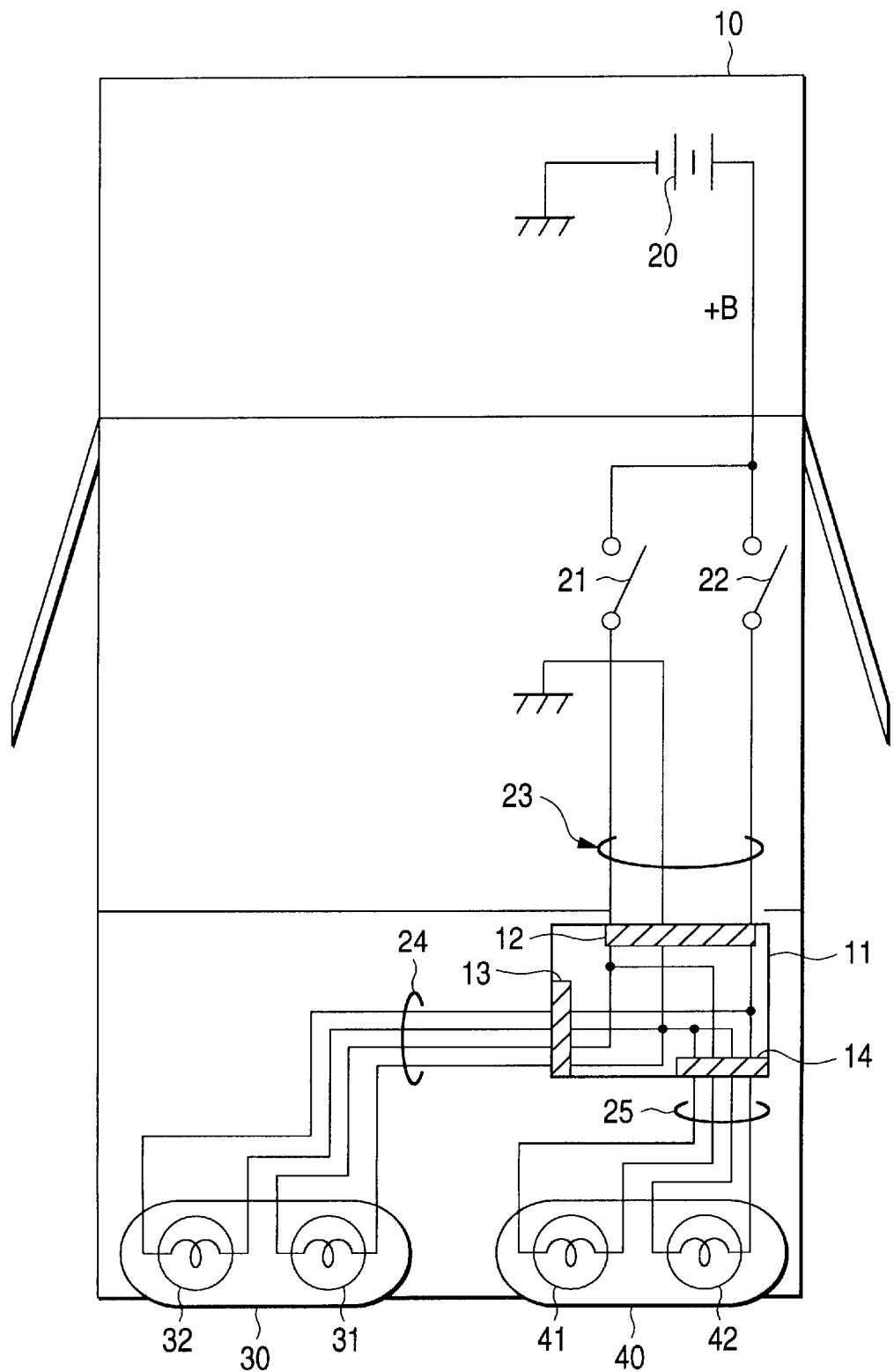
FIG. 2 is a wiring diagram showing a battery and rear combination lamps, with the lamp burnout detecting unit interposed therebetween, in accordance with the invention.

FIG. 2 is a wiring diagram showing a battery 20 and rear combination lamps with the burnout detecting unit 11. The burnout detecting unit 11 is mounted at the rear of a vehicle 10. A connector 12 is connected to a wire harness (or a floor harness) 23, through a tail switch 21 and a stop switch 22, and to the battery 20, so that the power of the battery 20, located at the front of the vehicle 10, is supplied to the rear of the vehicle 10.

A connector 13 is connected to a wire harness (or a rear harness) 24, and to a tail lamp 31 and a stop lamp 32, which form the left rear combination lamp 30. One of the wires that extends from the tail lamp 31 is connected through the printed circuit board 18 to the wire of the tail switch 21 which is in the floor harness 23, and the other wire is connected to the ground wire. Similarly, one of the wires that extends from the stop lamp 32 is connected through the printed circuit board 18 to the wire of the stop switch 22, which is also in the floor harness 23, while the other wire is connected to the ground wire of the floor harness 23.

A connector 14 is connected to a wire harness (or a rear harness) 25, and to a tail lamp 41 and a stop lamp 42, which form the right rear combination lamp 40. One of the wires that extends from the tail lamp 41 is connected through the printed circuit board 18 to the wire of the tail switch 21 which is in the floor harness 23, while the other wire is connected to the ground wire of the floor harness 23. Furthermore, one of the wires that extends from the stop lamp 42 is connected through the printed circuit board 18 to the wire of the stop switch 22 which is in the floor harness 23, while the other wire is connected to the ground wire of the floor harness 23.

As is apparent from the above description, because of the branch connection function (the branch points in the burnout detecting unit 11 shown as black dots) of the printed circuit board 18, the wiring with the wire harness is simplified, and the burnout detecting unit can be installed easily on the vehicle body 10.

Figure 3:
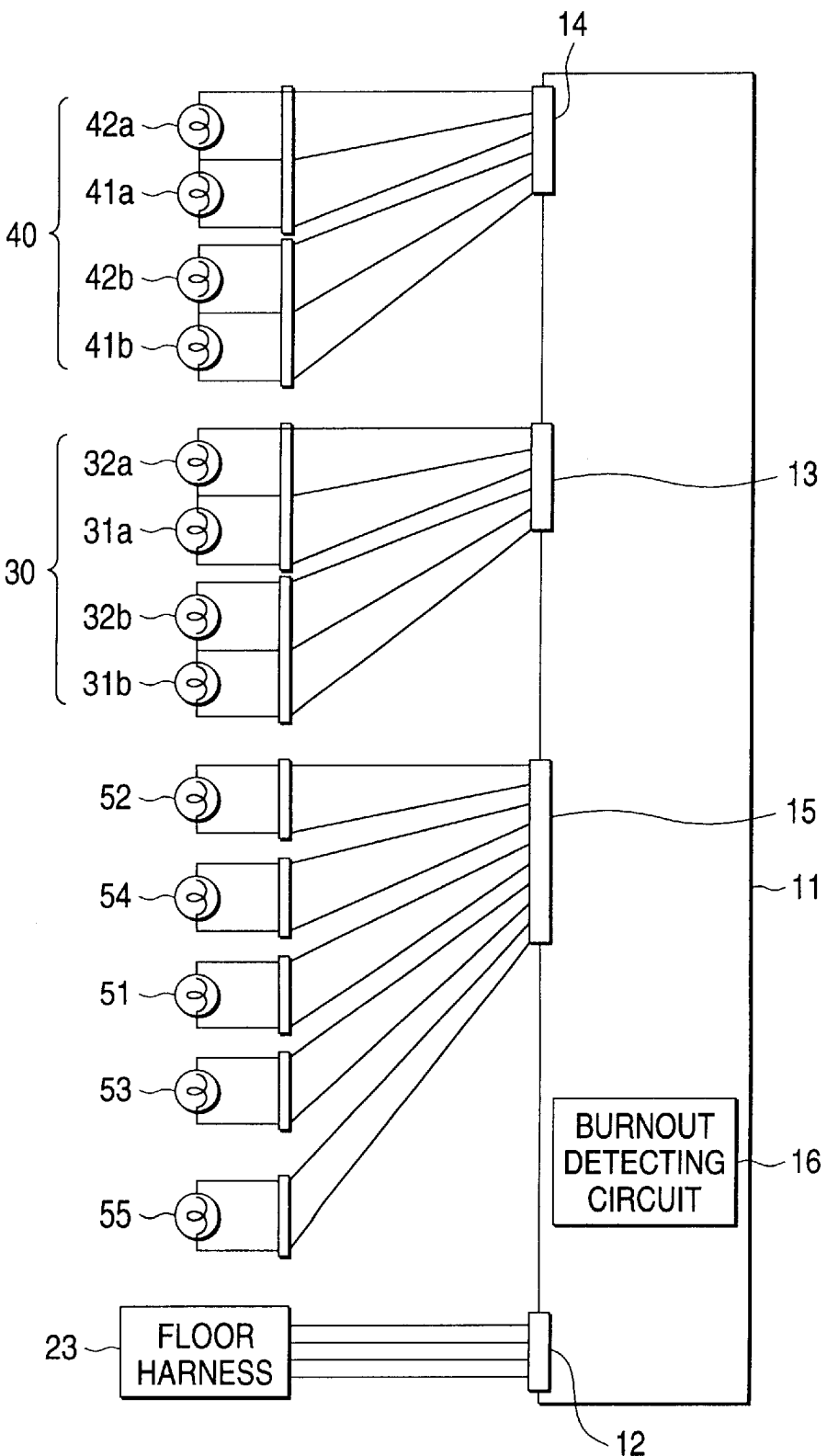
FIG. 3 is a wiring diagram showing the battery, the rear combination lamps, and other lamps with the lamp burnout detecting unit interposed therebetween, in accordance with the invention.
Figure 4:
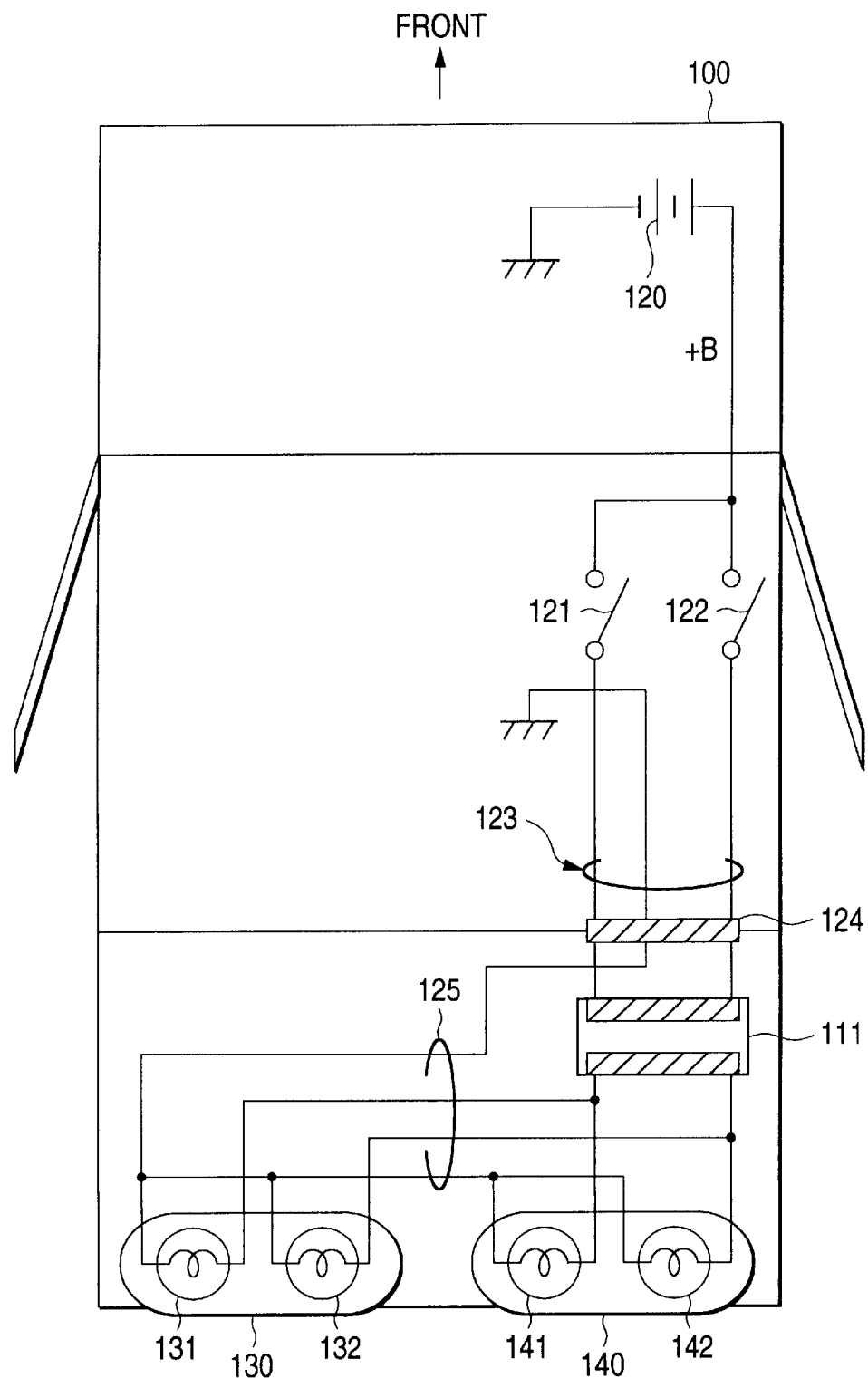
FIG. 4 is a wiring diagram showing a battery and rear combination lamps, with a conventional lamp burnout detecting unit interposed therebetween.

FIG. 3 is a wiring diagram showing the arrangement of the battery, the rear combination lamps and other lamps with the burnout detecting unit. The connection of these elements is the same as that of the conventional apparatus as shown in FIG. 5, and therefore the wiring in the burnout detecting unit is not shown.

The wire of the floor harness which extends from the stop switch is connected through the printed circuit board 18 and a connector 15 to one end of a high mount stop lamp, and through the printed circuit board 18, the current detecting resistor of the burnout detecting circuit section 16, and the connectors 13 and 14 to first ends of the stop lamps 32a, 32b, 42a, and 42b, to detect the burnout of any one of the stop lamps 32a, 32b, 42a and 42b.

The +B wires of the floor harness 23, which are to be connected to the right and left backup lamps 53 and 54, are connected through the printed circuit board 18 and the connector 15 to first ends of the lamps 53 and 54.

With respect to the +B wires, the ground wire of the floor harness 23 is connected through the printed circuit board 18 to the ground side (not shown) of the burnout detecting circuit section 16, and through the printed circuit board 18 and the connectors 13, 14 and 15 to the remaining second ends of the right and left rear combination lamps 30 and 40, the right and left license plate lamps 51 and 52, the right and left backup lamps 53 and 54, and the high mount stop lamp 55.

The operation of lighting the rear combination lamps is described with reference to FIG. 2.

When the tail switch 21 is turned on, the current of the battery 20 flows in the wire of the tail switch of the floor harness 23, and through the connector 12 and the current detecting resistor of the burnout detecting circuit section 16, and thereafter it is distributed by the printed circuit board 18. The currents obtained by the distribution, flow through the connectors 13 and 14 and the tail lamps 31 and 41, and then are returned to the connectors 13 and 14, and meet each other via the printed circuit board 18. The current which is obtained by the meeting of the currents as described above flows through the connector 12, and returns to the battery 20 from the ground wire of the floor harness. Thus, the tail lamps 31 and 41 are turned on.

Similarly, when the stop switch 22 is turned on, the current of the battery flows in the wire of the stop switch 22 of the floor harness 23, and through the connector 12 and the current detecting resistor of the burnout detecting circuit section 16, and is distributed by the printed circuit board. The currents obtained by the distribution, flow through the connectors 13 and 14, and the stop lamps 32 and 42, and meet each other via the printed circuit board 18. The current which is obtained by the meeting of the currents as described above flows through the connector 12, and returns to the battery from the ground wire of the floor harness 23. Thus, the stop lamps 32 and 42 are turned on.

In the above-described embodiment, the burnout detecting circuit section 16 detects the burnout of the rear combination lamps 30 and 40. However, the invention is not limited to this structure. The burnout detecting circuit section may be arranged so as to detect all or part of the right and left license plates lamps 51 and 52, right and left backup lamps 53 and 54, and the high mount stop lamp 55.

As is apparent from the above description, according to an aspect of the invention, the wiring of the whole system is simplified, and the installation thereof can be achieved with ease. Furthermore, the wire harness can also be automatically installed easily. Since no joint connector is used, it is unnecessary to provide spaces for installing a joint connector.

According to another aspect of the invention, the wiring of the battery and the rear combination lamps, with the lamp burnout detecting unit therebetween, is simplified.

According to another aspect of the invention, the wiring of the battery and the tail lamps, with the lamp burnout detecting unit interposed therebetween, is simplified.

According to another aspect of the invention, the wiring of the battery and the stop lamps, with the lamp burnout detecting unit interposed therebetween, is simplified.

What is claimed is:

1. A lamp burnout detecting unit with a branch connection function for a vehicle, comprising:
   a power source;
   at least one switch connected to the power source;
   a first press-in type connector located in a rear of the vehicle;
   a first wire harness connecting said at least one switch to said first connector;
   a power source wire that extends from the first connector;
   a plurality of lamps;
   a second press-in type connector located in the rear of the vehicle;
   a second wire harness connecting said plurality of lamps to said second connector;
   a burnout detecting section adapted to detect the burnout of at least one of the plurality of lamps;
   a branch connection section which connects the power source wire to each of the plurality of lamps; and
   a printed circuit board having said branch connection section located thereon located in the rear of the vehicle.

2. The lamp burnout detecting unit with a branch connection function according to claim 1, at least one of the plurality of lamps being a rear combination lamp.

3. The lamp burnout detecting unit with a branch connection function according to claim 1, at least one of the plurality of lamps being a tail lamp.

4. The lamp burnout detecting unit with a branch connection function according to claim 1, at least one of the plurality of lamps being a stop lamp.
   a printed circuit board having said branch connection section located thereon.

5. A method of installing a lamp burnout detecting unit with a branch connection function in a vehicle, comprising the steps of:
   connecting at least one switch to a power source;
   connecting a first wire harness between the at least one switch and a first press-in type connector in a rear part of the vehicle;
   extending a power source wire from the first connector;
   connecting a second wire harness between a plurality of lamps and a second press-in type connector in the rear part of the vehicle;
   providing a burnout detecting section adapted to detect the burnout of at least one of the plurality of lamps; and
   connecting the power source wire to each of the plurality of lamps with a printed circuit board having a branch connection section located thereon in the rear part of the vehicle.

6. A lamp burnout detecting unit with a branch connection function for a vehicle comprising:
   a first press-in type connector, located in a rear part of the vehicle, to which a first wire harness is connected which is connected through switches to a power source section;
   a second press-in type connector, located in the rear part of the vehicle, to which a second wire harness for a plurality of lamps is connected;
   a burnout detecting section between the first connector and second connector for detecting burnout of said lamps;
   a branch connection section which connects the power source section and said first connector to each of said plurality of lamps connected to said second connector; and
   a printer circuit board having said branch connection section located thereon located in the rear of the vehicle.

7. The lamp burnout detecting unit with a branch connection function of claim 6 further comprising:

a first casing connected to said first connector and said second connector; and a second casing.

8. The lamp burnout detecting unit with a branch connection function of claim 7 wherein said burnout detection section is mounted on said first casing.

9. The lamp burnout detecting unit with a branch connection function of claim 7 wherein said printed circuit board is located between said first casing and said second casing.

10. The lamp burnout detecting unit with a branch connection function of claim 6 wherein at least one of said plurality of lamps comprises a tail lamp.

11. The lamp burnout detecting unit with a branch connection function of claim 6 wherein at least one of said plurality of lamps comprises a rear combination lamp.

12. The lamp burnout detecting unit with a branch connection function of claim 6 wherein at least one of said plurality of lamps comprises a stop lamp.

* * * * *